United States Patent [19]

Terunuma

[11] 3,914,779

[45] Oct. 21, 1975

[54] DEVICE FOR MOUNTING AN ACCESSORY DEVICE TO AN ACCESSORY SHOE

[75] Inventor: Hiroshi Terunuma, Tokyo, Japan

[73] Assignee: Nippon Kogaku K.K., Tokyo, Japan

[22] Filed: Oct. 22, 1974

[21] Appl. No.: 516,959

[30] Foreign Application Priority Data
Nov. 1, 1973   Japan.................... 48-125870[U]

[52] U.S. Cl.............................. 354/295; 354/295
[51] Int. Cl.² ...................................... G03B 11/00
[58] Field of Search ................................ 354/295

[56] References Cited
UNITED STATES PATENTS
2,831,412   4/1958   Friedman............................ 354/295

*Primary Examiner*—John M. Horan
*Attorney, Agent, or Firm*—Fitzpatrick, Cella, Harper & Scinto

[57] ABSTRACT

A device for mounting an accessory device to an accessory shoe secured to a camera body comprises a connector member for connecting the accessory device, a coupling member fixed to the connector member and engageable with the accessory shoe, and a fixing member having legs. The fixing member is disposed between the connector member and the coupling member and movable between a first position and a second position. In the first position, the legs urge the camera body so as to urge the coupling member against the accessory shoe during engagement therebetween to thereby fix the connector and coupling members to the camera body. In the second position, the fixing member releases the pressure force of the coupling member to the accessory shoe. The device further comprises an operating member operative to move the fixing member to either of the first and second positions.

10 Claims, 5 Drawing Figures

DEVICE FOR MOUNTING AN ACCESSORY DEVICE TO AN ACCESSORY SHOE

BACKGROUND OF THE INVENTION

1. Field of the Invention

This invention relates to apparatus for mounting an accessory device such as a flashlight to the accessory shoe of a camera body.

2. Description of the Prior Art

There have heretofore been two types of mounting apparatus of the class described, one of which simply comprises a mounting element engageable with a device to be mounted to the camera body, hereinafter referred to as an "accessory device," and the other of which further comprises a plate spring or the like attached to a mount on the camera body, hereinafter referred to as an "accessory shoe."

In the former type, the engaging area is relatively small with respect to the accessory device which usually is relatively large in size and, moreover, the degree of contact is so small and unstable as to cause serious back-lash which sometimes result in disengagement of the accessory device from the camera body.

In the latter type, extraneous pressure forces exerted on the accessory device readily cause back-lash.

Particularly in a type wherein the engagement area between the accessory shoe and the accessory device provides an electrical connection, any slight back-lash might result in a circuit disconnection.

SUMMARY OF THE INVENTION

I have conceived by my invention apparatus of the class described by which I am able to eliminate all of the above-noted disadvantages, and more specifically, to provide apparatus which ensures an accessory device to be mounted to an accessory shoe on a camera body in a manner to eliminate the possibility of any back-lash.

According to one aspect of the present invention, the mounting means is provided with a plurality of legs adapted to be urged against a camera body thereby to provide an improved contact between the accessory shoe of the camera and the shoe of the mounting means. The legs are also useful as a support for the mounting means and eliminates any back-lash while, in response to the urging action of such legs, the shoe cover of the mounting means closes a mounting opening to prevent the mounting means from being disengaged from the accessory shoe, and accordingly to prevent the accessory device from disengaged from the camera body.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
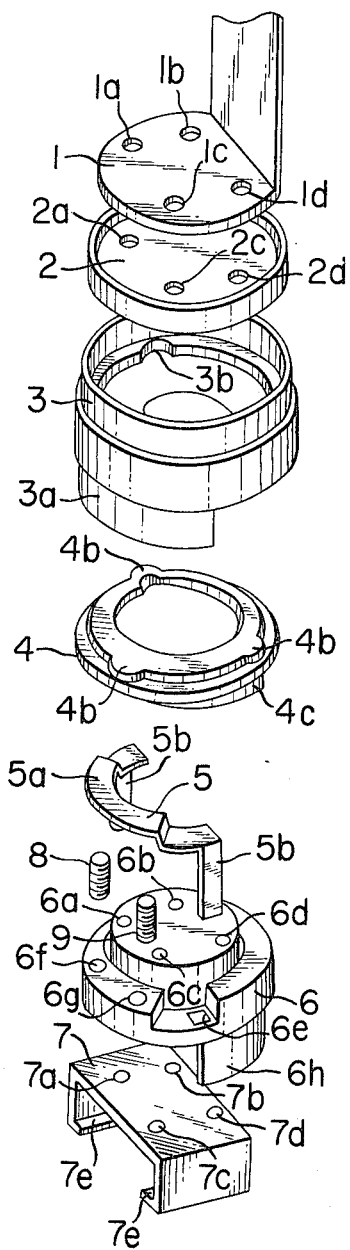
FIG. 1 is an exploded perspective view of the device according to a first embodiment of the present invention.

Referring to the drawings, an accessory device body (not shown) is connected to a connector element 1 which has holes 1a, 1b, 1c, 1d formed therethrough for passing screws (not shown) to be screwed into a shoe 7 which will be described hereinafter. An intermediate element 2 has holes 2a, 2c, 2d and 2b (not shown) similar to those in the connector element 1. The intermediate element 2 may be formed integrally with the connector element 1. The elements 1 and 2 together constitute a connector member.

A rotatable ring 3 is provided with a shoe cover 3a for closing, during mounting, a mounting opening of a coupling member which will be described hereinafter, and an inwardly extending circumferential projection have positioning recesses 3b formed in the inner peripheral surface thereof. A face cam 4 has a cam surface formed on that side thereof which is opposed to the accessory shoe, and also has lands formed on the side opposite to the cam surface and provided with protrusions 4b for mating with the recesses 3b.

The rotatable ring 3 and the face cam 4 may readily be formed integrally with each other. These elements 3 and 4 together constitute a rotatable member.

A fixing member 5 comprises an offset or raised portion 5a held by and between the cam surface and resilient members shown in the form of coil springs 8 and 9, and a pair of fixing legs 5b vertical with respect to the offset portion 5a and urged against the camera body, the fixing legs 5b extending at a right angle with respect to the longitudinal direction of coupling pieces 7e of the shoe which will be described later. The base 6 of the mounting device is formed with screw-receiving holes 6a, 6b, 6c and 6d similar to those in the connector element 1 and in the intermediate element 2. The base 6 is further provided with holes 6e, only one of which is shown, through which the fixing legs 5b may pass, bores 6f and 6g for receiving therein coil springs 8 and 9, and a shoe cover 6h formed on that side of the base which is opposed to the direction in which a shoe 7, later described, is inserted into the accessory shoe.

During the mounting and fixing, the shoe and the accessory shoe are surrounded by the cover 6h and the shoe cover 3a.

Although not shown, a stop is provided on one end of the cover 6h to limit the amount of rotation of the rotatable ring 3.

The shoe 7 is formed with screw receiving holes 7a, 7b, 7c and 7d and coupling pieces 7e to be inserted in corresponding grooves in the accessory shoe of the camera body.

The accessory shoe, as is well known, comprises a pair of opposed engagement grooves extending parallel to the optical axis of the camera. The base 6 and the shoe 7 may readily be formed integrally with each other. The elements 6 and 7 together constitute a coupling member. The coil springs 8 and 9 are accommodated with the spring receiving bores 6f and 6g and urge the offset portion 5a of the fixing member against the cam surface of the face cam 4.

Figure 2:
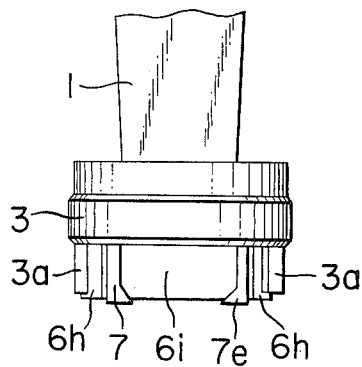
FIG. 2 is a front view of the same device when it is inserted.

Referring to FIG. 2, the cut-away portion 6i of the cover 6h in the base 6, serves as a mounting opening formed for the coupling member during insertion.

Now, the connector element 1, the intermediate element 2, the base 6 and the shoe 7 are secured together by means of four screws. The rotatable ring 3 and the face cam 4 are urged against the bottom of the intermediate element 2, with the fixing member 5 interposed therebetween, by the coil springs 8 and 9, and the rotatable ring 3 is rotatably mounted on the outer periphery of the intermediate element 2 and of the base 6.

Figure 3:
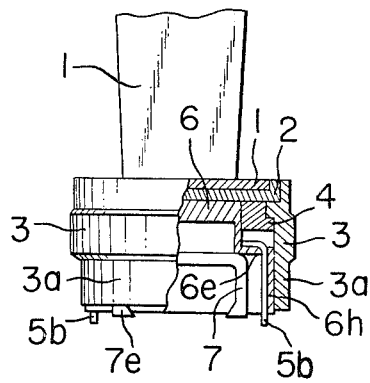
FIG. 3 is a front view, partly in cross-section, of the device when it is mounted and fixed.

In order that the shoe 7 may engage the accessory shoe, the rotatable ring 3 is rotated counter-clockwise until stopped by the stop on the cover 6h, whereupon the shoe cover 3a overlaps the cover 6h of the base to provide the mounting opening 6i, as shown in FIG. 2. Then the shoe 7 is inserted in the accessory shoe. When the shoe 7 has been inserted until stopped, the rotatable ring 3 is now rotated in the opposite (clockwise) direction, as viewed. When the rotation of the ring has been blocked by the stop on the cover 6h of the base, the mounting opening 6i will have been closed by the shoe cover 3a and the cover 6h of the base, as shown in FIG. 3. This prevents the shoe 7 from slipping out of the accessory shoe. As the rotatable ring 3 is rotated, the downwardly extending lug 4c of the face cam 4 urges the offset portion 5a of the fixing member downwardly against the bias of the coil springs 8 and 9, whereby the fixing legs 5b are forced down below the shoe 7. Thus, the reaction of the fixing member 5 from the camera body provides an intimate contact between the shoe 7 and the accessory shoe, and the fixing legs 5b provide legs for preventing vibration of the accessory device.

Figure 4:
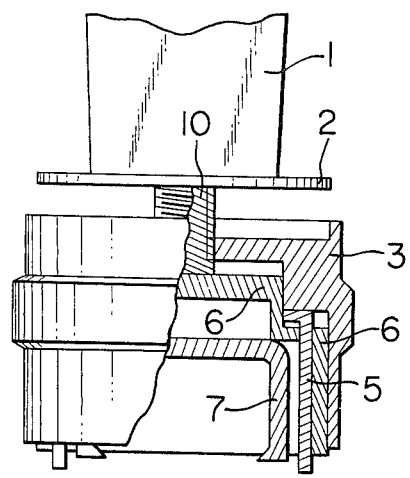
FIG. 4 is a front view, partly in cross-section, of the device according to a second embodiment of the present invention.

The first embodiment has so far been described as using a rotatable member to operate the fixing member, and the rotatable member is such that the distances between it and the connector member and the coupling member are constant and that the distance between the cam surface of the rotatable member and the accessory shoe is variable, whereas, it is also possible not to employ the cam surface but to utilize the rotation of the rotatable member which produces vertical movement of the rotatable member itself, which in turn varies the distance between the rotatable member and the accessory shoe to thereby move the fixing member, as shown in FIG. 4.

Figure 5:
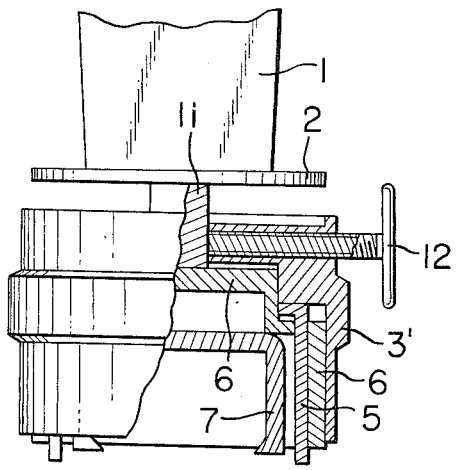
FIG. 5 is a front view, partly in cross-section, of the device according to a third embodiment of the present invention.

As a further alternative, a member vertically movable with the legs may be employed in lieu of the rotatable member so that the legs may produce a pressure force between the coupling member and the accessory shoe during the engagement therebetween, as shown in FIG. 5.

In FIG. 4, the rotatable ring 3 is formed with a female screw engaging with a male screw 10 which is secured to the connector element 2 and the base 6, so that the fixing member 5 is moved by rotating the rotatable ring 3.

In FIG. 5, a shaft 11 is secured to the connector element 2 and the base 6. A sliding member 3' is adapted to slide along the shaft 11. In association with the movement of the sliding member 3', a fixing member 5 is movable downwardly. A lever 12 is threadedly engaged with the sliding member 3' for fixing the same to the shaft 11. The lever 12 can fix the sliding member 3' to the shaft 11 in a position where an urging force may be produced between the coupling pieces and the accessory shoe.

Since the engagement between the accessory shoe and the shoe 7 occurs parallel to the picture-taking optical axis as mentioned previously, the vibration of the accessory device is particularly greater in the direction perpendicular to such optical axis. Therefore, a relatively efficient method of eliminating any back-lash is provided by the fixing legs 5b in a direction perpendicular to the longitudinal direction of the coupling pieces 7e of the shoe, as in the shown embodiment.

Also, the number of the fixing legs 5b is not limited to two but any desired number of them may be provided, and the coupling pieces 7e may be wedge-shaped in cross-section, as shown in FIGS. 4 and 5 to assure a firm connection with the accessory shoe.

Further, the resilient members have been shown to be coil springs, but essentially they may be any members which will be able to urge the offset portion of the fixing member against the cam surface of the face cam.

Additionally, the base is provided with a stop (not shown), whereas such stop is not always necessary because the rotatable ring is urged against the intermediate element by the resilient members, and the direction of rotation is not restricted.

According to the construction of the present invention, as has been described hitherto, when the accessory device has been mounted to the camera by the utilization of the accessory shoe on the camera body, there is no back-lash of the accessory device and slippage of the accessory device from the accessory shoe is eliminated. Moreover, the elimination of back-lash ensures positive electrical connection between the mounting device and the camera body.

I believe that the construction and operation of my novel apparatus will now be fully understood and that the advantages thereof will be fully appreciated by those persons skilled in the art.

I claim:

1. Apparatus for mounting an accessory device to an accessory shoe secured to a camera body, comprising:
    a connector member (1,2) for connecting said accessory device;
    a coupling member (6,7) fixed to said connector member and engageable with said accessory shoe;
    a fixing member (5) having at least one leg, said fixing member being disposed between said connector member and said coupling member and movable between a first position in which said leg presses against said camera body so as to urge said coupling member against said accessory shoe during engagement therebetween thereby to fix said connector and coupling members to said camera body, and a second position in which said fixing member releases the pressure force of said coupling member to said accessory shoe; and an operating member (3,4) operative to move said fixing member to either of said first and said second position.

2. A device according to claim 1, wherein said operating member has a first contact surface adapted to oppose said accessory shoe during engagement between said coupling member and said accessory shoe, said fixing member has a second contact surface adapted to oppose said first contact surface, said two contact surfaces are adapted to contact each other during engagement of said coupling member and said accessory shoe, and the contact between said two contact surfaces resulting from operation of said operating member moves said fixing member to fix said connector and coupling members to said camera body.

3. A device according to claim 2, wherein said operating member is rotatable with respect to said connector and coupling members, and said first contact surface may vary its distance from said accessory shoe upon rotation of said rotatable member thereby to move said fixing member to said first or said second position.

4. A device according to claim 3, wherein said rotatable member is so disposed that its distances to said connector member and to said coupling member are always constant, and said first contact surface is a cam surface.

5. A device according to claim 3, wherein said coupling member includes a shoe (7) having coupling pieces (7e) engageable with said accessory shoe, and a base (6) having a first shoe cover (6h), said rotatable member has a second shoe cover (3a), and said first and second shoe covers from a mounting opening upon engagement of said coupling pieces with said accessory shoe, whereafter said shoe cover moves circumferentially of said rotatable member upon rotation of said rotatable member which urges said fixing member downwardly, to close said mounting opening with said first shoe cover, whereby said coupling member is positively connected to said accessory shoe.

6. A device according to claim 2, wherein resilient members (8,9) are provided between said coupling member and said fixing member to bias said fixing member so that said second contact surface of said fixing member is always maintained in contact with said first contact surface of said rotatable member.

7. A device according to claim 1, wherein said fixing member has two legs each of which is disposed perpendicularly to the longitudinal direction of the engaging portion of said accessory shoe engaged by said coupling member.

8. A device according to claim 5, wherein the cross-section of said coupling pieces of said coupling member taken along a plane perpendicular to the longitudinal direction thereof is wedge-shaped.

9. A device according to claim 3, wherein said rotatable member is disposed so that its distances to said connector member and to said coupling member are variable, and said first contact surface is always parallel to said accessory shoe when said coupling member is engaged with said accessory shoe.

10. A device according to claim 1, wherein said operating member is formed integrally with said fixing member and slidable in a direction perpendicular to said accessory shoe during engagement between said coupling member and said accessory shoe thereby to fix said connector and coupling member to said camera body.

* * * * *